(12) United States Patent
Abe (10) Patent No.: US 12,025,814 B2
(45) Date of Patent: *Jul. 2, 2024

(54) METHODS AND SYSTEM FOR POSITION STABILIZATION

(71) Applicant: SEMICONDUCTOR COMPONENTS INDUSTRIES, LLC, Scottsdale, AZ (US)

(72) Inventor: Koichi Abe, Hashima (JP)

(73) Assignee: SEMICONDUCTOR COMPONENTS INDUSTRIES, LLC, Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/466,555

(22) Filed: Sep. 13, 2023

(65) Prior Publication Data

US 2024/0004212 A1  Jan. 4, 2024

Related U.S. Application Data

(63) Continuation of application No. 16/417,873, filed on May 21, 2019, now Pat. No. 11,796,831.

(60) Provisional application No. 62/780,704, filed on Dec. 17, 2018.

(51) Int. Cl.
| | |
|---|---|
| H02P 25/034 | (2016.01) |
| G01P 15/18 | (2013.01) |
| G02B 7/09 | (2021.01) |
| G02B 27/64 | (2006.01) |
| H02P 7/025 | (2016.01) |

(52) U.S. Cl.
CPC .......... *G02B 27/646* (2013.01); *G01P 15/18* (2013.01); *G02B 7/09* (2013.01); *H02P 7/025* (2016.02)

(58) Field of Classification Search
CPC ....... G02B 27/646; G02B 7/09; H02P 25/034; H02P 7/025; G01P 15/18
USPC .......................................................... 318/135
See application file for complete search history.

(56) References Cited

U.S. PATENT DOCUMENTS

| | | | |
|---|---|---|---|
| 6,289,733 B1 | 9/2001 | Challoner et al. | |
| 6,465,771 B2 | 10/2002 | Ohsawa | |
| 6,636,635 B2 | 10/2003 | Matsugu | |
| 6,853,947 B1* | 2/2005 | Horton | G01C 21/188 |
| | | | 702/150 |
| 9,146,134 B2* | 9/2015 | Lokshin | G01C 17/38 |
| 10,257,419 B2 | 4/2019 | Kitano | |
| 11,003,054 B2 | 5/2021 | Kabasawa et al. | |
| 2001/0014171 A1 | 8/2001 | Iijima et al. | |
| 2003/0007680 A1 | 1/2003 | Iijima et al. | |
| 2003/0040776 A1 | 2/2003 | Kroll et al. | |

(Continued)

FOREIGN PATENT DOCUMENTS

| | | |
|---|---|---|
| JP | 10510520118 A | 12/2015 |
| KR | 20150143077 A | 12/2015 |

*Primary Examiner* — Gabriel Agared
(74) *Attorney, Agent, or Firm* — Dickinson Wright PLLC (57) ABSTRACT

Various embodiments of the present technology may provide methods and systems for position stabilization. The methods and systems for position stabilization may be integrated within an electronic device. An exemplary system may include a driver circuit responsive to a gyro sensor and a feedback signal from an actuator. The driver circuit may be configured to calibrate a gain applied to a drive signal based on the posture of the electronic device.

20 Claims, 12 Drawing Sheets

(56) References Cited

U.S. PATENT DOCUMENTS

| | | | |
|---|---|---|---|
| 2006/0038718 A1* | 2/2006 | Arakane | G01C 21/1654 342/357.32 |
| 2007/0058163 A1 | 3/2007 | Handman | |
| 2008/0140257 A1 | 6/2008 | Sato et al. | |
| 2011/0038622 A1 | 2/2011 | Tanaka | |
| 2011/0105181 A1* | 5/2011 | McLeod | H04N 23/6811 348/208.5 |
| 2011/0197674 A1* | 8/2011 | Prandi | G01C 19/5762 73/504.12 |
| 2013/0083963 A1 | 4/2013 | Okamoto | |
| 2014/0202229 A1* | 7/2014 | Stanley | G01C 25/005 73/1.79 |
| 2014/0320678 A1* | 10/2014 | Lee | G02B 27/646 348/208.1 |
| 2014/0378191 A1 | 12/2014 | Hosoi et al. | |
| 2015/0033821 A1* | 2/2015 | Mangano | G01C 19/00 73/1.77 |
| 2015/0160011 A1* | 6/2015 | Nakajima | G01C 19/5776 702/56 |
| 2015/0201129 A1* | 7/2015 | Mak | H04N 23/687 348/208.5 |
| 2016/0037053 A1 | 2/2016 | Honjo et al. | |
| 2016/0236617 A1 | 8/2016 | Smyth | |
| 2016/0337562 A1 | 11/2016 | Kang et al. | |
| 2018/0245946 A1* | 8/2018 | Weinberg | G01C 19/5684 |
| 2019/0260932 A1 | 8/2019 | Jung et al. | |
| 2020/0192115 A1 | 6/2020 | Abe | |

* cited by examiner

| ZONE | THETA (degrees) | PHI (degrees) | DELTA (degrees) |
|---|---|---|---|
| 8 | | | |
| 7 | H090 | H090 | DOWN |
| 6 | | | |
| 5 | H180 | UP | H180 |
| 4 | | | |
| 3 | H270 | H270 | UP |
| 2 | | | |
| 1 | H000 | DOWN | H000 |

METHODS AND SYSTEM FOR POSITION STABILIZATION

CROSS-REFERENCE TO RELATED APPLICATION

This application is a continuation of U.S. patent application Ser. No. 16/417,873 filed May 21, 2019 titled "Methods and Systems For Position Stabilization," which claims the benefit of U.S. Provisional Patent Application Ser. No. 62/780,704, filed on Dec. 17, 2018, and incorporates the disclosure of the application in its entirety by reference.

BACKGROUND OF THE TECHNOLOGY

Many electronic devices have an imaging system integrated within them, and in some cases, the electronic device may be turned and/or rotated for the purpose of a desired image capture. In many cases, the imaging system may be controlled by an optical imaging stabilization (OIS) system. In particular, the OIS system may operate to stabilize various components of the imaging system, such as a lens, and to correct for involuntary movements of the electronic device, for example movements caused by a shaking hand (hand tremors). However, as the posture of the electronic device changes, gravity may influence the optical image stabilization system and/or a position of the lens in a non-uniform manner. This non-uniform influence may be due, in part, to how various components in the imaging system, such as coils, springs, etc., respond to gravity. As a result, given a specific target position code, the actual position of the lens may vary depending on the particular posture.

SUMMARY

Various embodiments of the present technology may provide methods and systems for position stabilization. The methods and systems for position stabilization may be integrated within an electronic device. An exemplary system may include a driver circuit responsive to a gyro sensor and a feedback signal from an actuator. The driver circuit may be configured to calibrate a gain applied to a drive signal based on the posture of the electronic device.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various controllers, amplifiers, signal converters, drivers, current sources, voltage sources, logic gates, semiconductor devices, such as transistors, capacitors, and the like, which may carry out a variety of functions. In addition, the present technology may be integrated in any number of electronic systems, such as imaging systems, automotive, aviation, "smart devices," portables, medical, scientific, surveillance, and consumer electronics, and the systems described are merely exemplary applications for the technology.

The present technology may be used in conjunction with any position sensor circuit that may benefit from gravity compensation, such as a position sensor used for motor control and a gyro sensor used for detecting the position of a cell phone. Further, the present technology may employ any number of conventional techniques for capturing image data, converting data signals, filtering data signals, generating driver signals, and the like.

Methods and systems for position stabilization according to various aspects of the present technology may be integrated within any suitable electronic device or system, such as imaging systems, "smart devices," wearables, consumer electronics, and the like. According to various embodiments, the present technology may generate a position signal, determine a posture or position of the electronic device, and apply an appropriate gain value to the position signal for the determined posture or position.

Figure 1:
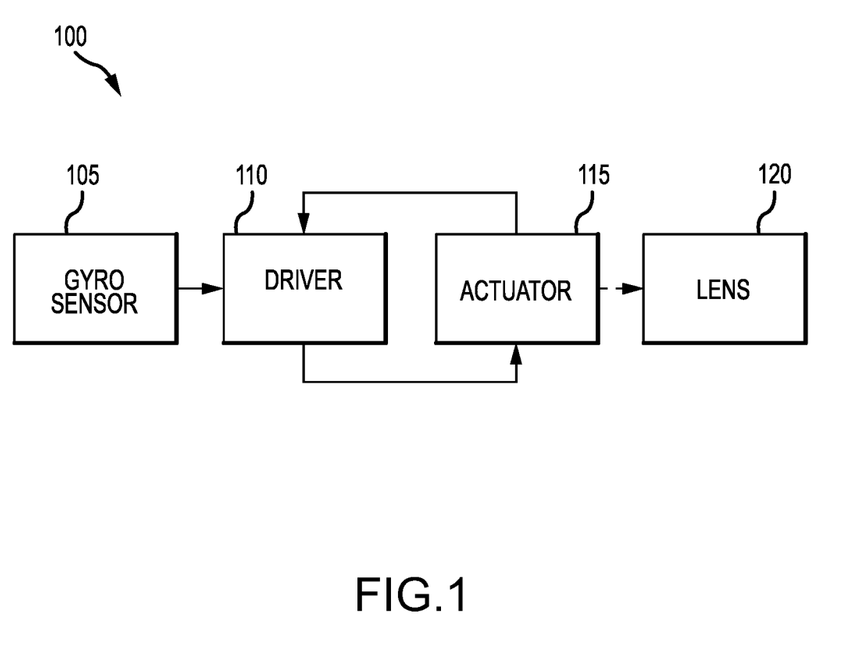
FIG. 1 is a block diagram of an optical image stabilization system in accordance with an exemplary embodiment of the present technology.

Referring to FIG. 1, an exemplary system 100 may be integrated in an electronic device, such as a cell phone comprising an imaging system. In various applications, the system 100 may operate to stabilize various components of the imaging system, such as a lens 120, and to correct for movements of the cell phone, for example movements caused by involuntary movements, such as hand tremors, or voluntary movements, such as posture changes to the electronic device. In the present application, the system 100 may be referred to as an optical image stabilization (OIS) system. According to various embodiments, the system 100 may comprise a gyro sensor 105, a driver circuit 110, and an actuator 115. The system 100 may be configured as a closed-loop system (e.g., as illustrated in FIG. 1) or an open-loop system.

The gyro sensor 105 measures the orientation, rotation, motion, and/or angular velocity of the electronic device and generates a corresponding gyro signal. In an exemplary embodiment, the gyro signal may be a digital signal. The gyro sensor 105 may be connected to the driver circuit 110 and configured to transmit the gyro signal to the driver circuit 110. The gyro signal may comprise a first signal corresponding to an acceleration of the device (a gyro acceleration signal $G_{ACC}$) and/or a second signal corresponding to an angular velocity of the device (a gyro velocity signal $G_{VEL}$). The gyro sensor 105 may detect the angular velocity due to the Coriolis force that is applied to a vibrating element. This motion produces a potential difference as a result of sensing the angular velocity.

According to an exemplary embodiment, the gyro acceleration signal $G_{ACC}$ may comprise three components, each corresponding to an axis of a reference coordinate system. For example, the gyro acceleration signal $G_{ACC}$ may comprise an x-component, a y-component, and a z-component.

The gyro sensor 105 may comprise any suitable sensor system or device configured to detect motion, rotation, and/or angular velocity produced by external factors and generate a corresponding electrical signal. The gyro sensor 105 may be selected according to a particular application and may be selected according to various specifications, such as sensing range, output type, supply current, operating temperature and the like.

The actuator 115 may be configured to move the lens 120 along various axes (e.g., along an x-, y-, and/or z-axis) to improve image quality. The actuator 115 may comprise any suitable device or system capable of moving and/or repositioning the lens 120 in response to a signal. The actuator 115 may be configured to move the lens 120 for the purpose of performing autofocus functions, counteracting involuntary movements, such as hand jitter or shaking, and the like. For example, in one embodiment, the actuator 115 may comprise a voice coil motor, comprising a driving magnet (not shown) and a sensing magnet (not shown), that is responsive to a drive signal $S_{DR}$ from the driver circuit 110. The actuator 115 may be limited in the amount of movement it can perform, whether self-limiting or due to the design of the system. For example, the lens 120 may be enclosed in a housing (not shown) with sidewalls. As such, a maximum range of movement the actuator 115 may impart to the lens 120 may be limited by the interior dimensions housing.

The lens 120 may be configured to focus light on an image sensor (not shown). The lens 120, the actuator 115, and the driver circuit 110 may operate in conjunction with each other to provide an autofocus function. For example, the actuator 115 may respond to the driver circuit 110 to move the lens 120 either closer to or away from the image sensor to focus an image/scene on the image sensor. The lens 120 may further be configured to move along a plane that is parallel to the sensing surface of the image sensor (i.e., up and down, side-to-side).

The lens 120 may comprise any lens or lens system suitable for focusing light on the image sensor. For example, in various embodiments, the lens 120 may comprise a plurality of lens elements arranged adjacent to each other. Alternatively, the lens 120 may comprise a single lens element. The lens 120 may be formed using any suitable material, such as glass, quartz glass, fluorite, germanium, meteoritic glass, polycarbonate, plastic, high-index plastic, and the like, or any combination thereof.

The driver circuit 110 controls and supplies power to various devices within the system 100. For example, the driver circuit 110 may supply power to the actuator 115 via the drive signal $S_{DR}$. The drive signal $S_{DR}$ may control a current or a voltage in the actuator 115, which controls the movement of the actuator 115. Accordingly, the movement of the actuator 115 may be proportional to the magnitude of the drive signal $S_{DR}$. The driver circuit 110 may comprise any suitable control device or system capable of providing energy to the actuator 115.

Figure 2:
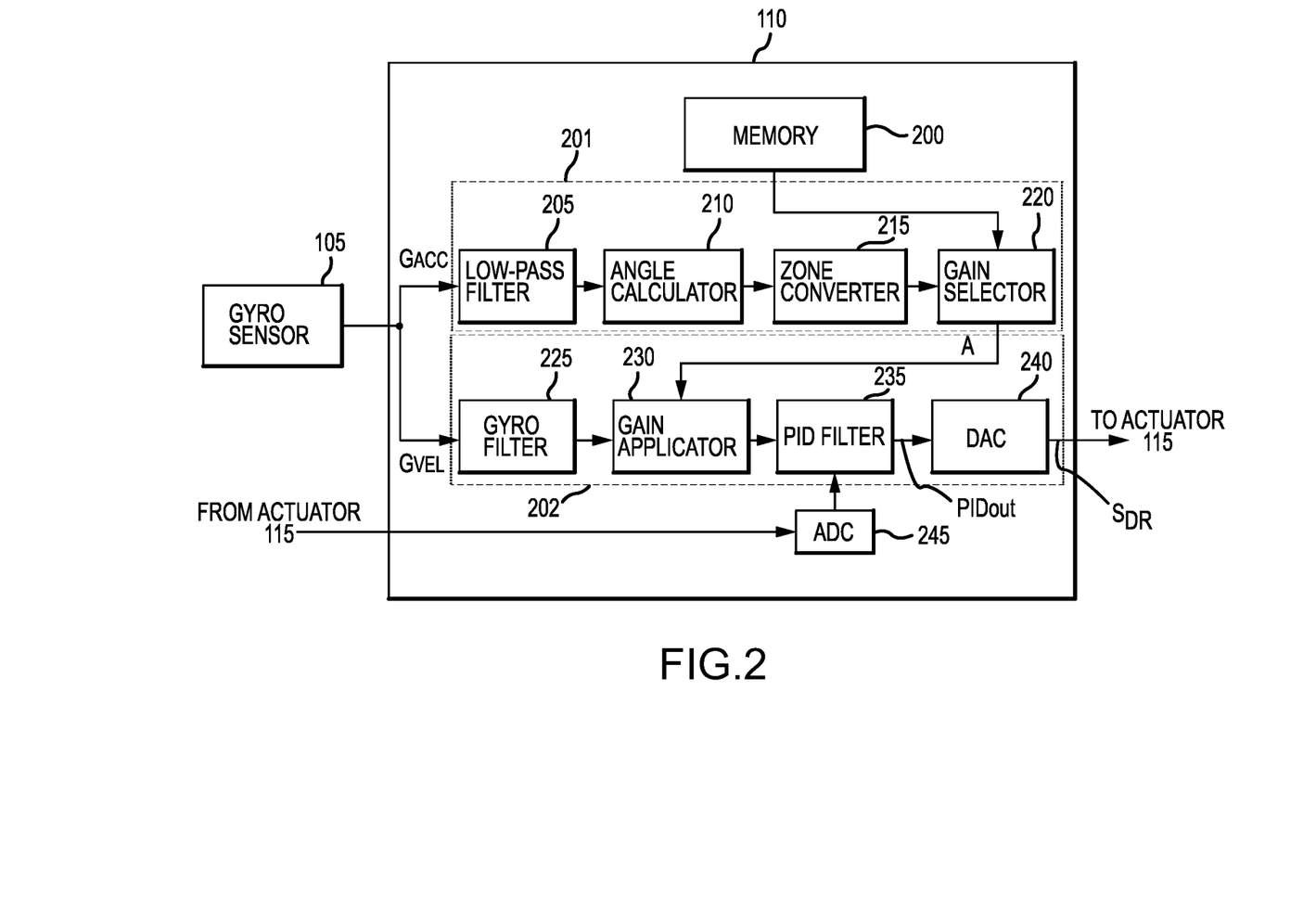
FIG. 2 is a block diagram of a driver circuit in accordance with an exemplary embodiment of the present technology.

The driver circuit 110 may receive and respond to a feedback signal, such as a hall sensor signal from a hall sensor (not shown). The hall sensor may be configured to detect an actual position of the actuator 115 and/or the lens 120. The feedback signal may comprise an analog signal. Accordingly, the driver circuit 110 may be configured to convert the analog feedback signal into a digital signal. For example, the driver circuit 110 may comprise an analog-to-digital converter (ADC) 245 to receive the analog feedback signal and convert it into a digital feedback signal. The ADC 245 may comprise any circuit and/or ADC architecture suitable for converting an analog signal into a digital signal.

According to an exemplary embodiment, the driver circuit 110 may utilize the feedback signal in conjunction with the gyro signals to determine an appropriate amount of power to supply to the actuator 115 based on a desired lens position. In other words, the drive signal $S_{DR}$ may be based on the feedback signal and the gyro signals.

The driver circuit 110 may further receive and respond to signals from the gyro sensor 105. For example, the driver circuit 110 may utilize signals from the gyro sensor 105 to determine the appropriate amount of power to supply to the actuator 115 to achieve a desired position of the lens 120.

According to an exemplary embodiment, the driver circuit 110 may receive the x-, y-, and z-components of the gyro acceleration signal $G_{ACC}$ and utilize the signal to compute various angles, convert each angle to a zone value, and select and apply a gain A to the gyro velocity signal $G_{VEL}$ based on the zone values and/or angles. For example, the x-, y-, and z-components of the gyro acceleration signal $G_{ACC}$ may correspond to one of a plurality of predetermined postures of the electronic device 300, and the driver circuit 110 may be configured to apply the gain A based on various predetermined postures of the electronic device 300. In other cases, the electronic device 300 may be in a posture other than one of the predetermined postures. In such as a case, the driver circuit 110 may be configured to compute a gain value A according to the x-, y-, and z-components of the gyro acceleration signal $G_{ACC}$. According to an exemplary embodiment, the driver circuit 110 may comprise a first circuit portion 201 to receive the gyro acceleration signal $G_{ACC}$ and may comprise a low-pass filter 205, an angle calculator 210, a converter 215, and a gain selector 220.

According to various embodiments, the system 100 may further comprise a memory 200 configured to store a plurality of predetermined gain values, $A_1$ through $A_N$. For example, the memory may store a first gain value $A_1$ (e.g., 'H000' gain), a second gain value $A_2$ (e.g., 'H270' gain), a third gain value $A_3$ (e.g., 'H180' gain), a fourth gain value $A_4$ (e.g., 'H090' gain), a fifth gain value $A_5$ (e.g., 'UP' gain), and a sixth gain value $A_6$ (e.g., 'DOWN' gain). The particular value assigned to each gain may be selected according to the particular application and prior testing of the system and may be set to a value at or near 0.5. For example, 'H000' gain=0.46, 'H270' gain=0.55, 'H180' gain=0.52, 'H090' gain=0.44, 'DOWN' gain=0.48, and 'UP' gain=0.53. In various embodiments, the particular values for each gain may be different. However, in some cases, some values may be the same. The memory 200 may comprise a flash memory or any other suitable memory type. In addition, the memory 200 may be integrated within the driver circuit 110, or alternatively, may be formed on a companion circuit that is accessible to the driver circuit 110.

Figure 3A:
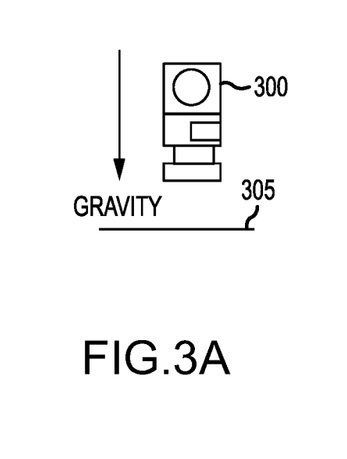
FIG. 3A representatively illustrate a first posture of an electronic device in accordance with the present technology.
Figure 3B:
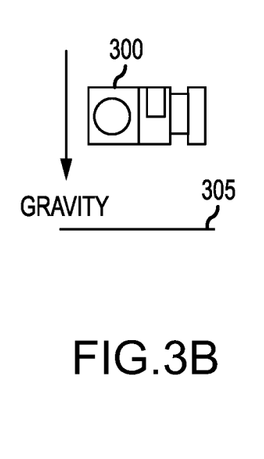
FIG. 3B representatively illustrate a second posture of the electronic device in accordance with the present technology.
Figure 3C:
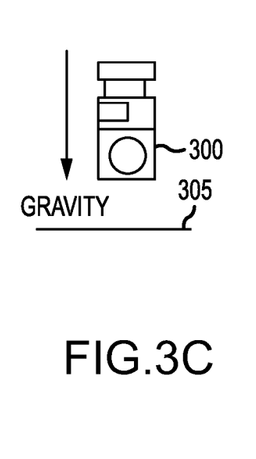
FIG. 3C representatively illustrate a third posture of the electronic device in accordance with the present technology.
Figure 3D:
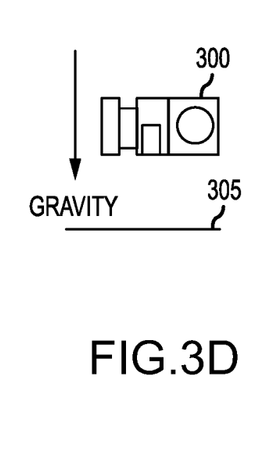
FIG. 3D representatively illustrate a fourth posture of the electronic device in accordance with the present technology.
Figure 3E:
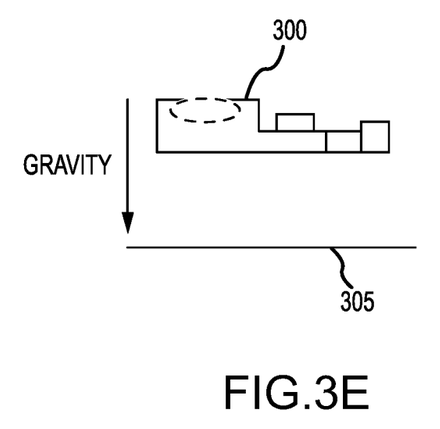
FIG. 3E representatively illustrate a fifth posture of the electronic device in accordance with the present technology.
Figure 3F:
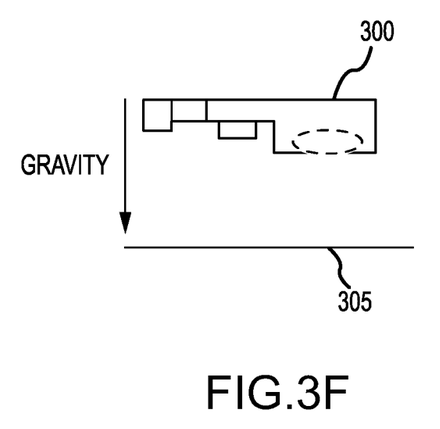
FIG. 3F representatively illustrate a sixth posture of the electronic device in accordance with the present technology.

According to various embodiments, the gain values may be set according to a particular posture of the electronic device 300. In other words, each of the gain values may correspond to a particular posture. For example, and referring to FIGS. 3A-3F, a first posture may be defined as an upright position (normal position) of the electronic device 300 (e.g., FIG. 3A) and may correspond to the 'H000' gain; a second posture may defined as the electronic device turned on its left side (e.g., FIG. 3B) and may correspond to the 'H090' gain; a third posture may be defined as the electronic device 300 turned upside-down (e.g., FIG. 3C) and may correspond to the 'H180' gain; a fourth posture may be defined as the electronic device 300 turned on its right side (e.g., FIG. 3D) and may correspond to the 'H270' gain; a fifth posture may be defined as the electronic device 300 turned facing up (e.g., FIG. 3E) and may correspond to the 'UP' gain; and a sixth posture may be defined as the electronic device 300 turned facing down (e.g., FIG. 3F) and may correspond to the 'DOWN' gain. All positions are relative to a reference ground 305 and gravity. Each posture may also be defined according to the x-, y-, and z-components of the gyro acceleration signal $G_{ACC}$ and/or the theta, delta, and phi angles.

The low-pass filter 205 may be configured to attenuate various frequencies in the gyro acceleration signal $G_{ACC}$. For example, in an exemplary embodiment, the low-pass filter 205 may be coupled to the gyro sensor 105 and configured to receive the x-, y-, and z-components of the gyro acceleration signal $G_{ACC}$. The low-pass filter 205 may be configured to filter each component separately. For example, the low-pass filter 205 may comprise a plurality of sub-filters, wherein each sub-filter is used to filter one component of the gyro acceleration signal $G_{ACC}$. In an exemplary embodiment, the low-pass filter 205 may have a low cut-off frequency to remove noise from the gyro acceleration signal $G_{ACC}$. The low-pass filter 205 may comprise an infinite impulse response digital filter system.

Figure 5:
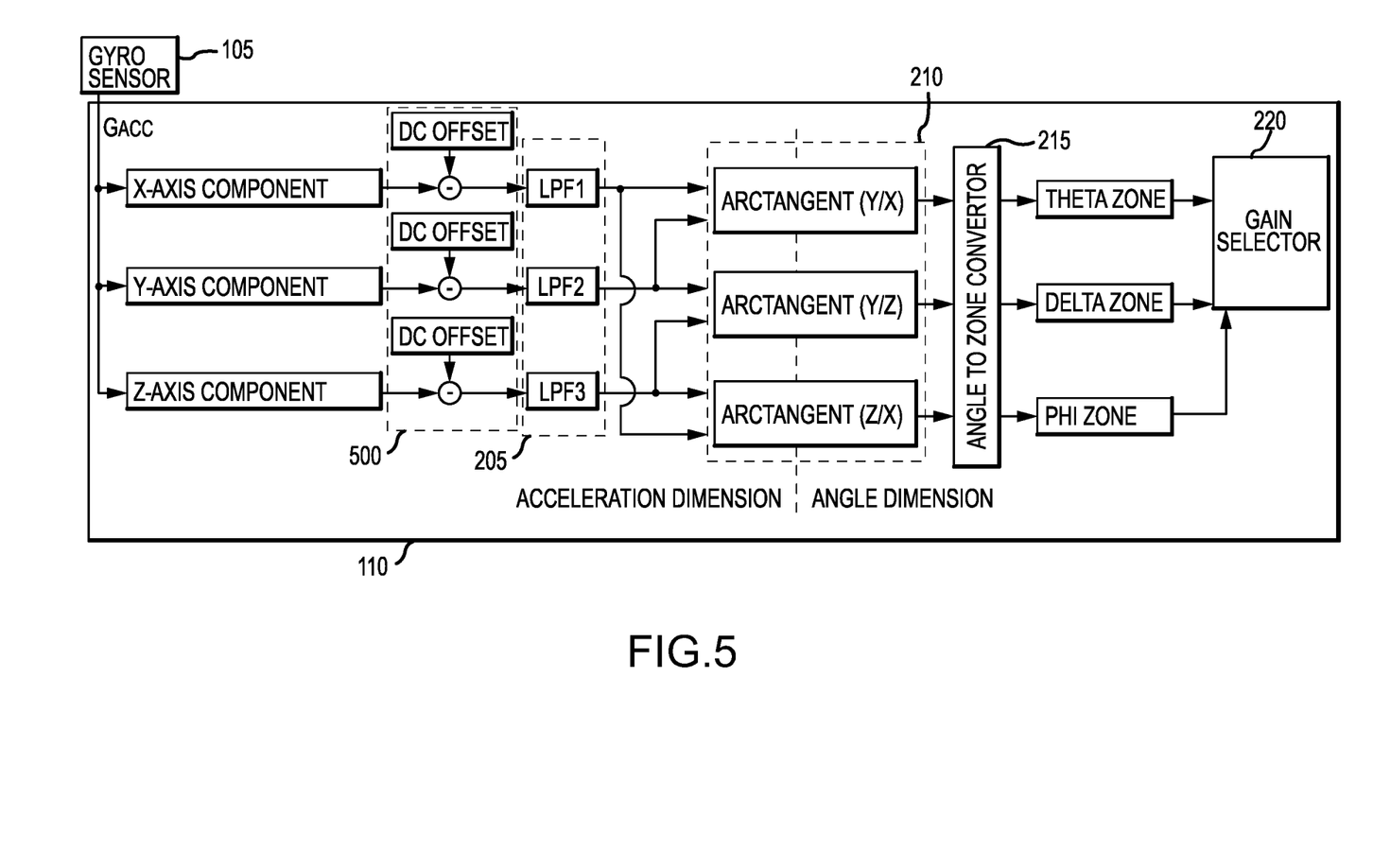
FIG. 5 representatively illustrates the driver circuit converting a gyro signal into a zone value in accordance with an exemplary embodiment of the present technology.

The driver circuit 110 may be further configured to adjust the gyro acceleration signal $G_{ACC}$ and remove a DC offset from each of the x-, y-, and z-components of the gyro acceleration signal $G_{ACC}$ prior to being transmitted to the low-pass filter 205. For example, the driver circuit 110 may comprise a computation circuit 500 configured to receive each component of the gyro acceleration signal $G_{ACC}$ and subtract a DC offset value from each component.

Figure 7:
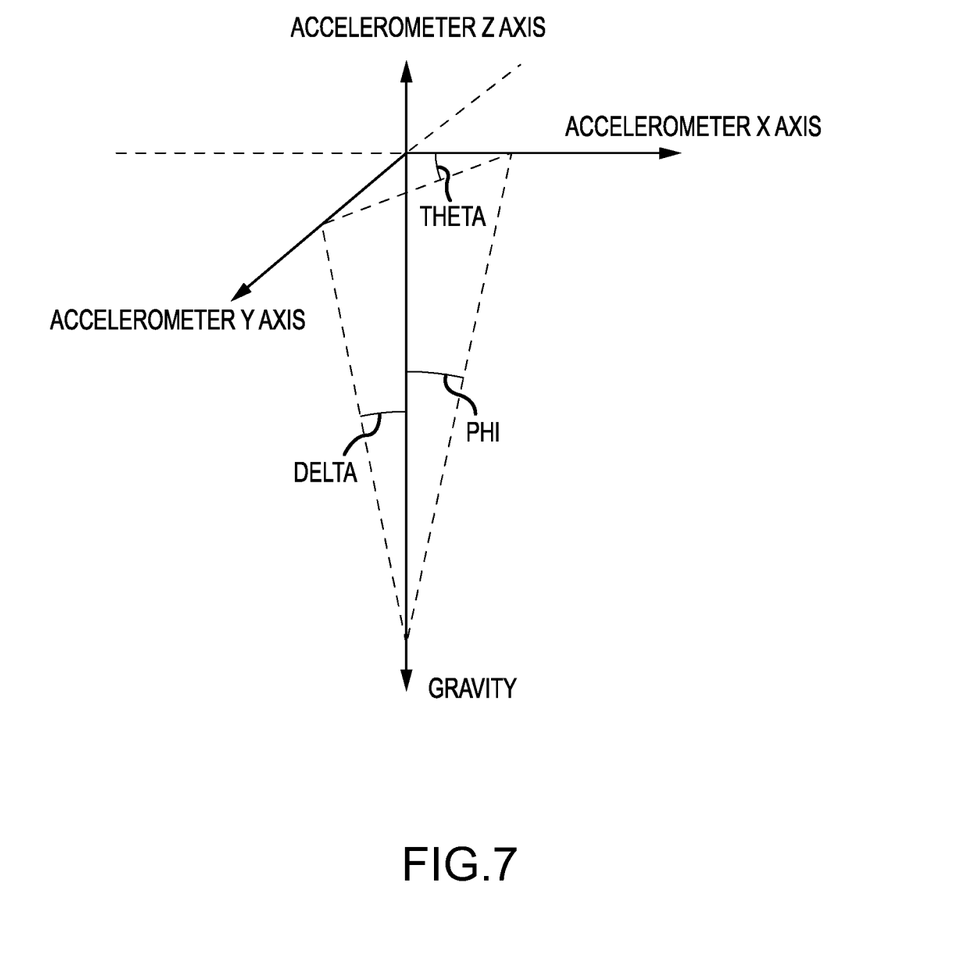
FIG. 7 representatively illustrates an accelerometer coordinate system in accordance with an exemplary embodiment of the present technology.

Referring to FIGS. 2, 5, and 7, the angle calculator 210 may be configured to compute various angles, such as a theta angle, a delta angle and a phi angle, in units of degrees. The theta, delta, and phi angles may be defined according to a reference coordinate system, for example as illustrated in FIG. 7. According to an exemplary embodiment, the theta, delta, and phi angles may be computed based on x-, y-, and z-components (X, Y, and Z, respectively) of the gyro acceleration signal $G_{ACC}$. For example, the theta angle may be equal to the arctangent of Y divided by X (i.e., theta=arctangent(Y/X)); the delta angle may be equal to the arctangent of Y divided by Z (i.e., delta=arctangent(Y/Z)); and the phi angle may be equal to the arctangent of Z divided by X (i.e., phi=arctangent(Z/X)).

In various embodiments, the angle calculator 210 may be configured to receive each component (i.e., x-, y-, and z-components) of the gyro acceleration signal $G_{ACC}$ from the low-pass filter 205.

In various embodiments, the angle calculator 210 may comprise any circuit and/or system suitable for performing division calculations, arctangent calculations, and the like. For example, the angle calculator 210 may comprise a system of logic circuits or a field programmable gate array circuit.

Figure 6:
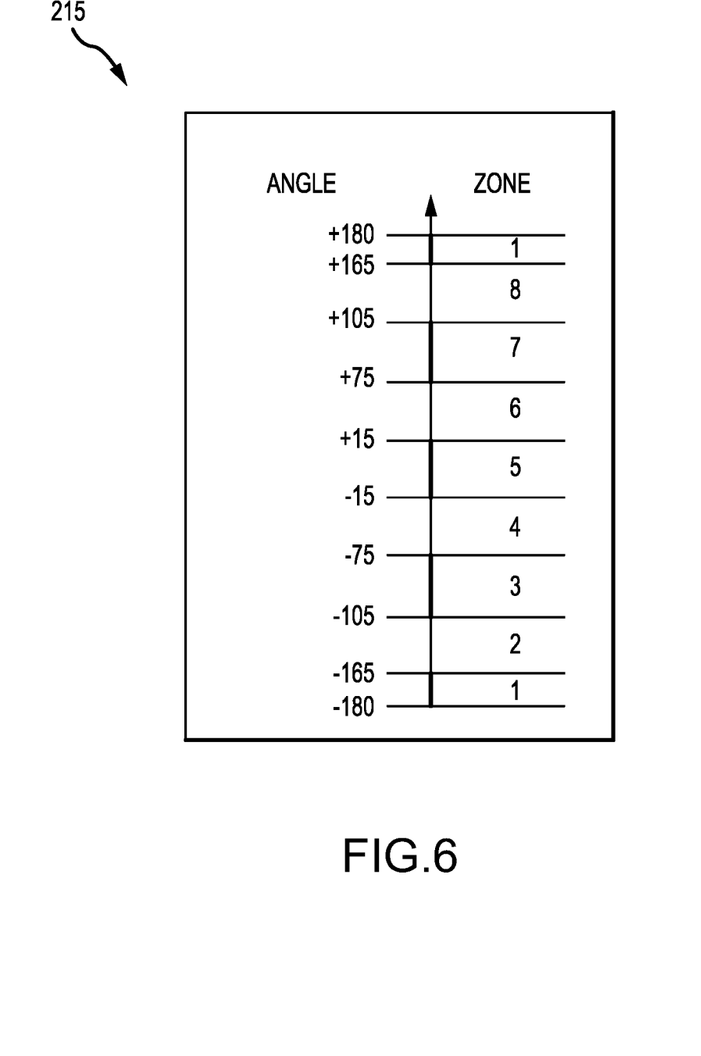
FIG. 6 is a conversion chart for converting an angle into a zone value in accordance with an exemplary embodiment of the present technology.

Referring to FIGS. 2, 5, and 6, the converter 215 may be configured to convert each computed angle to a zone value. For example, the converter 215 may be connected to an output terminal of the angle calculator 210 and configured to receive the computed theta, delta, and phi angles. According to an exemplary embodiment, the converter 215 may assign each of the theta, delta, and phi angles to one of a plurality of predefined zones, such as zones 1 through 8, based on the particular numerical value of each angle.

Each zone may be defined by any suitable range of angles. In an exemplary embodiment, each of the odd-numbered zones (i.e., zones 1, 3, 5, and 7) may comprise a 30 degree period, while the even-numbered zones (i.e., zones 2, 4, 6, and 8) may comprise a 60 degree period. For example, zone 1 may be defined as all angles ranging from −180 to −165 and angles ranging from +165 to +180, zone 2 may be defined as angles −165 to −105, zone 3 may be defined as angles −105 to −75, zone 4 may be defined as angles −75 to −15, zone 5 may be defined as angles −15 to +15, zone 6 may be defined as angles +15 to +75, zone 7 may be defined as angles +75 to +105, and zone 8 may be defined as angles +105 to +165. Accordingly, a theta angle of −147 degrees corresponds to zone 2.

Alternatively, each zone, both odd-numbered and even-numbered zones, may comprise a 45 degree period. The range of angles and/or period assigned to each zone may be selected according to the specifications of the actuator, system requirements, desired operating specifications, and the like.

The converter 215 may generate a theta zone according to the theta angle and the predefined zones, a delta zone according to the delta angle and the predefined zones, and a phi zone according to the phi angle and the predefined zones. The particular numerical values of the zones are arbitrary values.

In addition, each zone or combination of zones may be associated with or correspond to one of the predetermined postures, as illustrated in FIGS. 3A-3F, and/or the predetermined plurality of gain values. For example, odd-numbered zones (i.e., zones 1, 3, 5, and 7) may be associated with the predetermined postures and the predetermined plurality of gain values and may be referred to as "fixed zones." Even-numbered zone may be associated with gain values that are between two of the predetermined gain values.

According to various embodiments, the converter 215 may comprise any circuit and/or system suitable for converting a numerical angle into a new form by assigning a numerical value to the particular numerical angle.

Referring to FIGS. 2, 8A-8B, 9, and 10, the gain selector 220 may be configured to make a series of comparisons based on the theta, delta, and phi zone values. For example, the gain selector 220 may be connected to and receive the theta zone, the delta zone, and the phi zone values from the converter 215. According to an exemplary embodiment, the gain selector 220 uses the theta, delta, and phi zone values to determine the gain value A. The gain value A may be selected from a plurality of predetermined gain values. Alternatively, the gain value A may be calculated based on the actual value of the theta, delta, or phi angle. The gain selector 220 may cycle through a variety of possible combinations of zone values to determine the appropriate predetermined gain value or compute the gain.

Figure 8A:
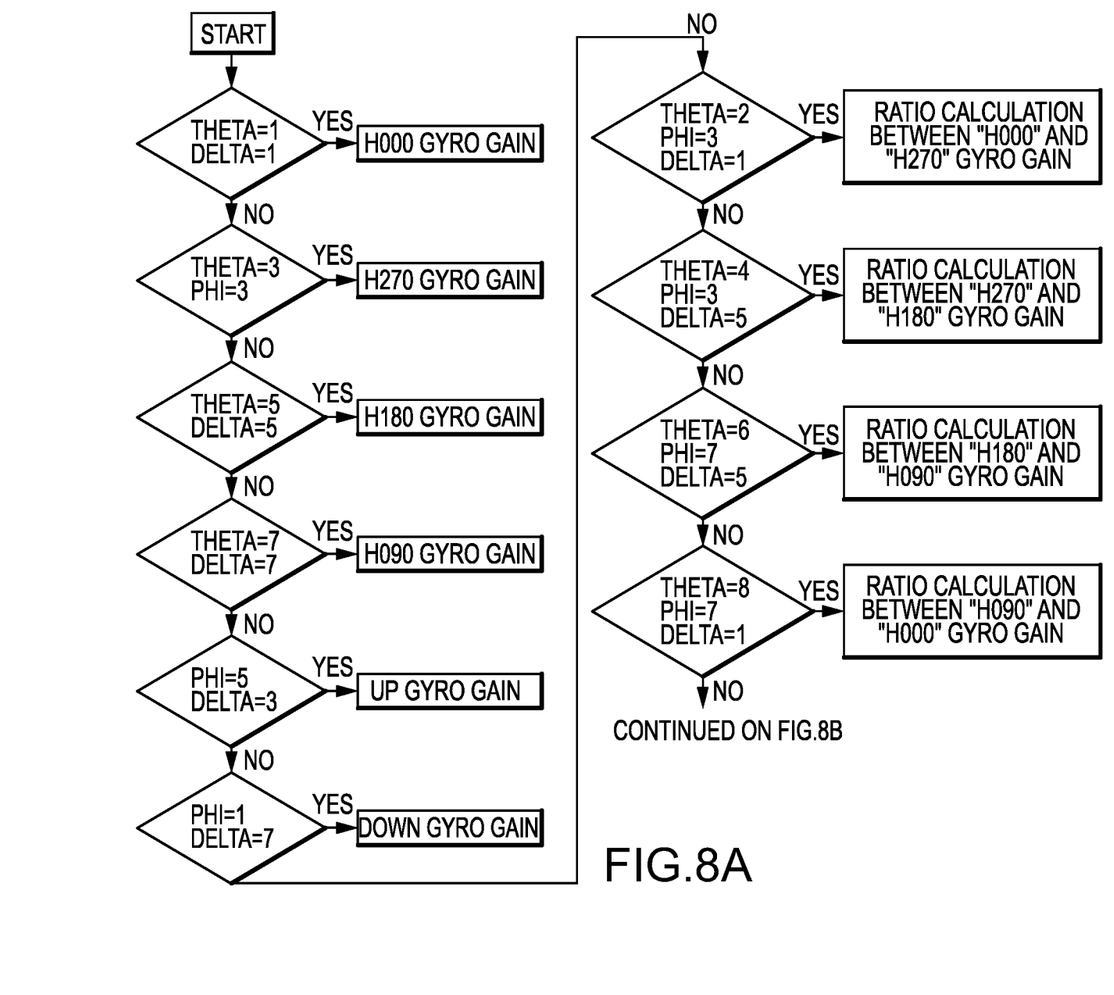
FIGS. 8A-8B is a flow diagram for selecting a gain value in accordance with an exemplary embodiment of the present technology.
Figure 8B:
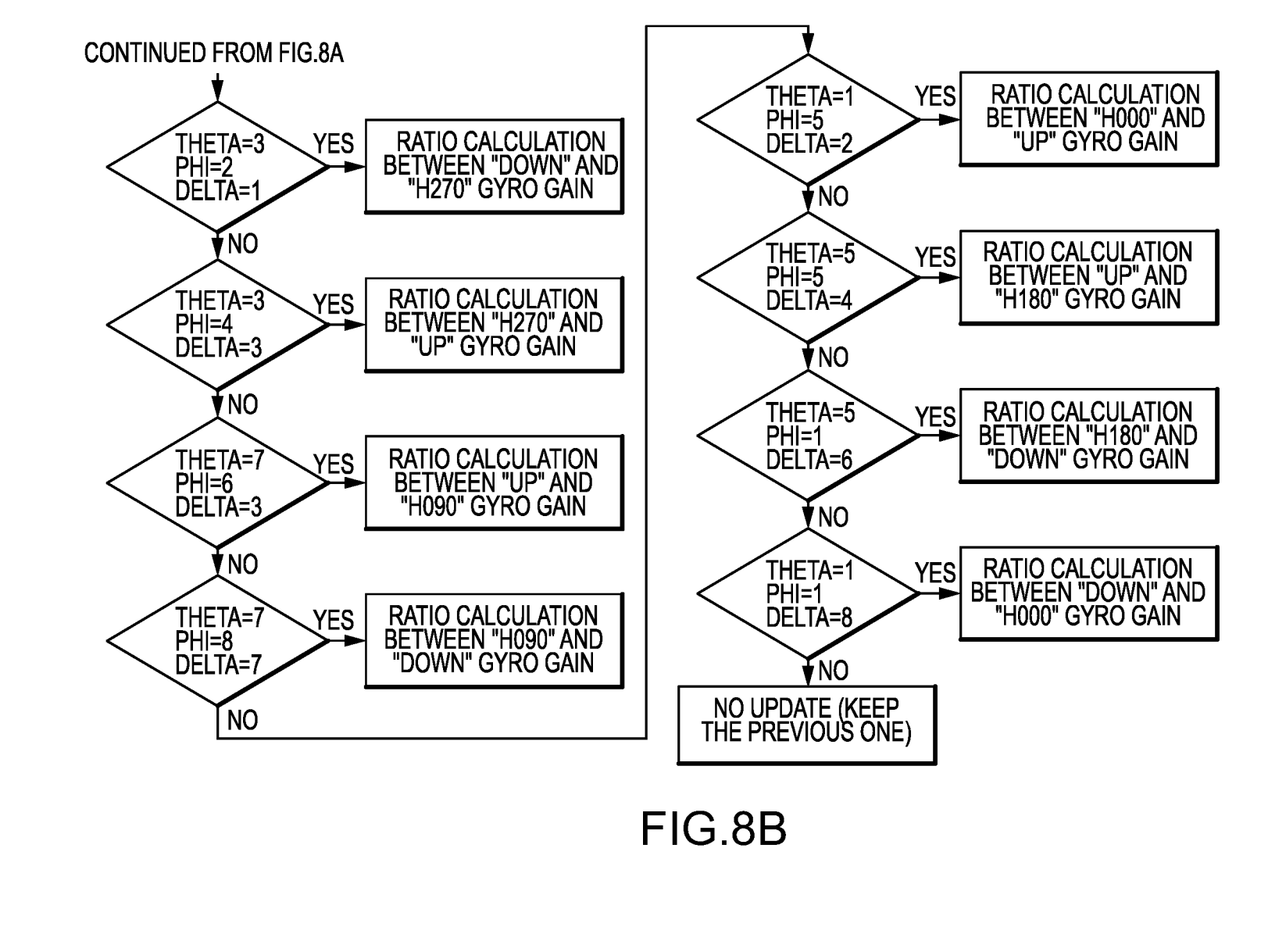
Figure 9:
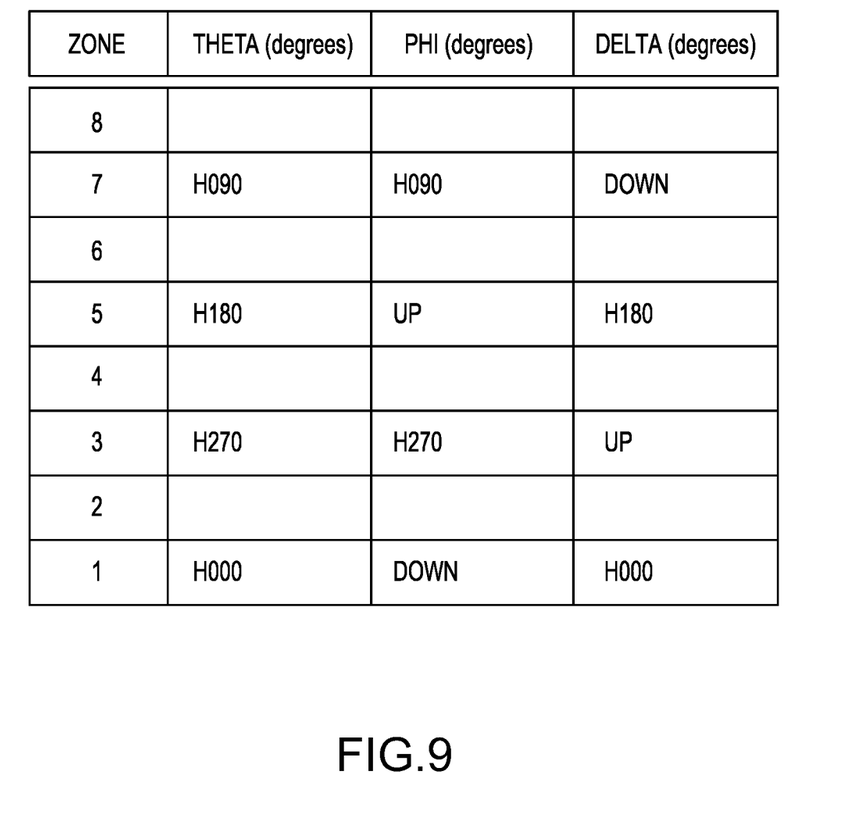
FIG. 9 is a chart illustrating the relationship between various gain values, angles, and zone values in accordance with an exemplary embodiment of the present technology.

According to an exemplary embodiment, in some cases, the gain selector 220 may apply one of the predetermined gain values to the gain velocity signal $G_{VEL}$. For example, if one zone has a zero value, then the gain selector 220 may select one of the predetermined gains based on the value of the remaining zone values. For example, if the theta angle corresponds to zone 1 and the delta angle corresponds to zone 1 (with no phi zone, because the phi angle is zero), then the gain selector 220 may select the 'H000' gain value.

Figure 10:
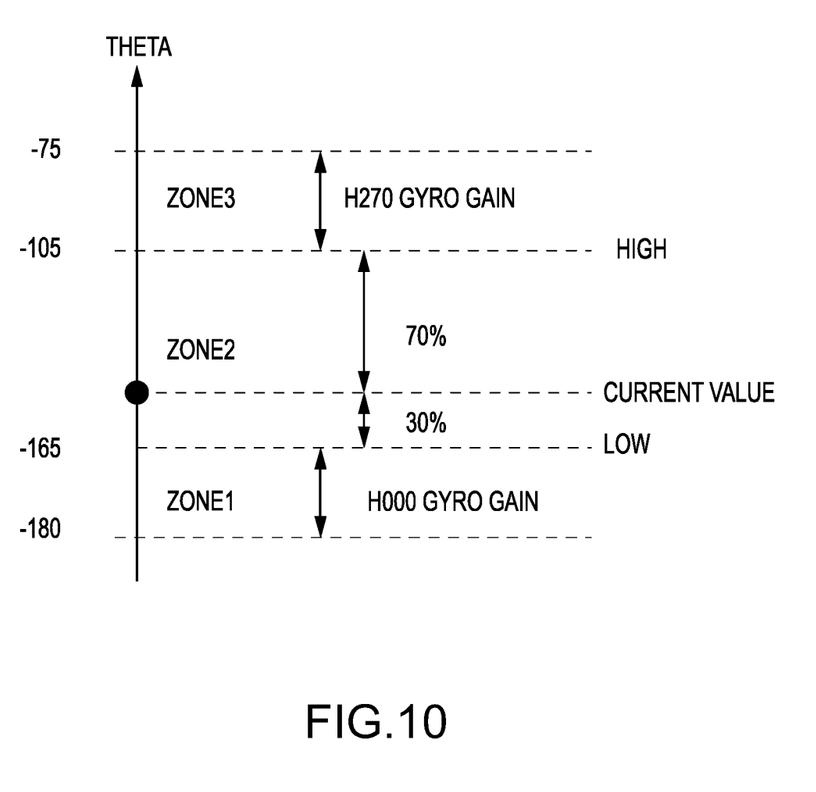
FIG. 10 representatively illustrates calculating a gain ratio in accordance with the present technology.

In other cases, when every zone has a value other than zero, then the gain selector 220 may be configured to a compute a ratio according to the various zones. The gain selector 220 may then use the ratio and the predetermined gain values to compute the gain A. For example, if the theta angle corresponds to zone 2, the phi angle corresponds to zone 3, and the delta angle corresponds to zone 1, then the driver circuit 110 may compute a ratio between a lowest zone (e.g., zone 1) and a highest zone (e.g., zone 3). According to an exemplary embodiment, the ratio calculation is as follows: Ratio=((val−low)/(high−low)), where 'val' is the angle (in degrees) of an even zone number (e.g., 2, 4, 6, and 8), 'low' is the low magnitude angle (in degrees) of the lowest zone, and 'high' is the high magnitude angle (in degrees) of the highest zone.

In the present example, the theta angle corresponds to zone 2, which is the even zone number. In addition, the low magnitude angle of the lowest zone (i.e., zone 1) is −165, and the high magnitude angle of the highest zone (i.e., zone 3) is −105. Therefore, if theta is −147 degrees, then: ratio= ((−147)−(−165))/((−105)−(−165))=0.3. In this case, the ratio indicates that the gain A should consist of 70% of the 'H000' gain and 30% of the 'H270' gain. The gain selector 220 may then compute the gain A as follows: A=('H000' gain)*(0.7)+ ('H270' gain)*(0.3). Similar computations may be performed when the theta angle corresponds to even-numbered zones (i.e., 4, 6, and 8), when the delta angle corresponds to even-numbered zones (i.e., 2, 4, 6, and 8), and when the phi angle corresponds to even-numbered zones (i.e., 2, 4, 6, and 8).

Referring to FIG. 2, the driver circuit 110 may be further configured to process the gyro velocity signal $G_{VEL}$, apply a gain A to the gyro velocity signal $G_{VEL}$, and transform the gyro velocity signal $G_{VEL}$ into the drive signal $S_{DR}$. For example, the driver circuit 110 may comprise a second circuit portion 202 to receive the gyro velocity signal $G_{VEL}$ and may comprise a gyro filter 225, a gain application circuit 230, a PID filter 235, and a digital-to-analog converter (DAC) 240.

The gyro filter 225 performs various functions on a signal (e.g., the gyro velocity signal $G_{VEL}$), such as integration and frequency characteristic adjustment (i.e., DC cutting). For example, the gyro filter 225 may integrate an angular velocity of the gyro velocity signal $G_{VEL}$ and prevent transmission of gyro signals at undesired frequencies. The gyro filter 225 may be coupled between the gyro sensor 105 and the gain application circuit 230. In various embodiments, the gyro filter 225 may comprise an interface (I/F) circuit (not shown) and an integrator circuit (not shown).

The gain application circuit 230 may be configured to receive an input signal, such as the gyro velocity signal $G_{VEL}$, and apply a gain value A to the input signal. For example, the gain application circuit 230 may be connected to the gain selector 220 and receive a gain A that corresponds to the selected gain (from the predetermine gain values) or a computed gain (in the case where the ratio is calculated). The gain application circuit 230 may be further connected to the gyro filter 225 and receive the gyro velocity signal $G_{VEL}$ via the gyro filter 225. Accordingly, the gain application circuit 230 may apply the gain A received from the gain selector 220 to the gyro velocity signal $G_{VEL}$. The gain application circuit 230 may comprise an amplifier circuit or any other circuit and/or system suitable for receiving an input signal and applying a gain to the input signal.

The PID (proportional-integral-derivative) filter 235 may be configured to receive an error value, such as the gyro velocity signal GVEL, and apply a correction based on proportional, integral and derivative terms. The PID filer 235 may operate to minimize the error over time by adjusting a control variable PIDout. The PID filer 235 may comprise a conventional PID controller circuit. For example, the PID controller 235 may comprise a P controller (not shown) to account for present values of the error, an I controller (not shown) to account for past values of the error, and a D controller (not shown) to account for possible future trends of the error, based on a current rate of change.

According to an exemplary embodiment, the PID 235 may be connected to and receive the gyro velocity signal $G_{VEL}$ from the gain application circuit 230. The PID filter 235 may generate the control variable PIDout based on the gyro velocity signal GVEL. The PID filer 235 may transmit the control variable PIDout to the DAC 240. In various embodiments, the PID filer 235 may comprise circuitry to remove noise from the various PID process signals.

The DAC 240 may be configured to convert a digital input signal into an analog signal. For example, the DAC 240 may receive the control signal PIDout from the PID filter 235 and convert it into the drive signal $S_{DR}$. The DAC 240 may be connected to an output terminal of the PID filter 235 and may transmit the drive signal $S_{DR}$ to the actuator 115. The DAC 240 may comprise any suitable circuit and/or system suitable for converting a digital signal into analog signal.

In operation, and referring to FIGS. 1-10, the driver circuit 110 may calibrate the drive signal $S_{DR}$ according to the particular position of the electronic device 300. According to an exemplary embodiment, calibrating the drive signal $S_{DR}$ may comprise receiving an input signal, such as the gyro signal having an x-component, a y-component, and a z-component, from the gyro sensor 105. Calibrating the drive signal may further comprise computing various angles, such as the theta angle, the delta angle, and the phi angle, based on the x-, y-, and z-components, as described above.

Calibrating the drive signal may further comprise determining a gain. In an exemplary embodiment, the driver circuit 110 may select one of the predetermined gain values from the memory 200 if one of the computed angles (i.e., theta, delta, and phi) is equal to zero. In addition, the remaining angles may be assigned to one of the fixed zones (e.g., zones 1, 3, 5, and 7). For example, if the theta angle falls within zone 1, the delta angle falls within zone 1, and the phi angle is zero, then the driver circuit 110 may select the 'H000' gain. If the theta angle falls within zone 3, the phi angle falls within zone 3, and the delta angle is zero, then the driver circuit 110 may select the 'H270' gain. The driver circuit 110 may compare the angles to six fixed combinations that correspond to each of the predetermined gain values.

If the angles do not meet the criteria of the six fixed combinations, then the driver circuit 110 may compute a gain. Computing the gain may comprise computing the ratio, as described above, based on an actual value of one of the angles and zone threshold angles (e.g., high threshold angle and low threshold angle).

The driver circuit 110 may then generate the gain signal A, which may represent either a predetermined gain value or a computed gain value, and apply the gain to the input signal. The input signal may then be converted into the drive signal $S_{DR}$, for example by utilizing the PID filter 235 and other feedback signals, such as from the hall sensor.

Figure 4:
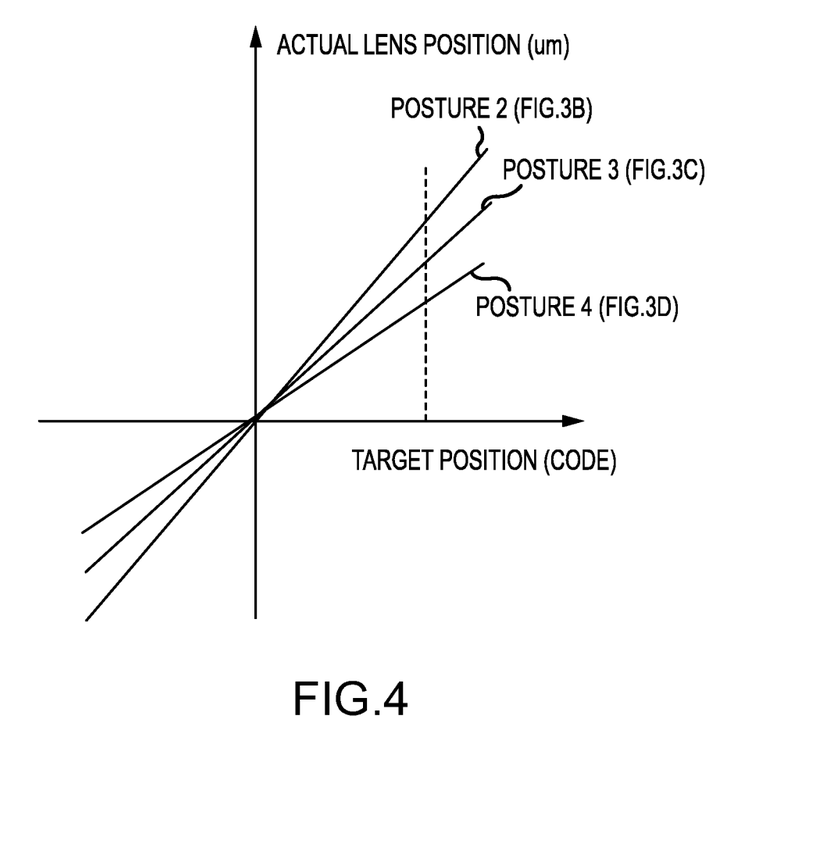
FIG. 4 is a graph illustrating a lens position at a particular target position for various postures of the electronic device in accordance with the present technology.

Embodiments of the present technology may compensate for the effect that gravity has on various components in the system 100. For example, and referring to FIGS. 3 and 4, given a particular target position (code), the actual lens position may vary depending on the posture of the electronic device 300. The target position (code) may correspond to a particular current value applied to the actuator 115, so when a particular lens position is desired, the amount of current required by the actuator 115 may be different based on the particular posture of the electronic device 300 at that instance. Accordingly, the gain A applied to the gyro signal takes the posture of the electronic device 300 into consideration to generate an appropriate drive signal $S_{DR}$ that will move the lens 120 to the desired position.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. An apparatus, comprising:
   a first circuit configured to:
   receive an acceleration signal from a gyro sensor, wherein the acceleration signal includes an x-component, a y-component, and a z-component;
   compute a first angle based on the y-component and the x-component, a second angle based on the z-component and the x-component, and a third angle based on the y-component and the z-component;
   determine whether one of the first, second, and third angles has a zero value;
   select, in response to one of the first, second, and third angles having a zero value, one of a plurality of predetermined zones, each predetermined zone of the plurality of predetermined zones representing a range of angles, based on the remaining angles and assigning the predetermined zone to the angle equaling zero; and
   select a first gain value from a plurality of predetermined gain values based on the first, second, and third angles; and
   a second circuit configured to:
   receive an angular velocity signal from the gyro sensor;
   apply the first gain value to a filtered version of the angular velocity signal to generate a modified signal; and
   generate a drive signal based on the modified signal.

2. The apparatus of claim 1, wherein to compute the first angle, the first circuit is further configured to determine a first arctangent of the y-component divided by the x-component.

3. The apparatus of claim 1, wherein to compute the second angle, the first circuit is further configured to determine a second arctangent of the z-component divided by the x-component.

4. The apparatus of claim 1, wherein to compute the third angle, the first circuit is further configured to determine a third arctangent of the y-component divided by the z-component.

5. The apparatus of claim 1, wherein the second circuit is further configured to integrate the angular velocity signal to generate the filtered version of the angular velocity signal.

6. The apparatus of claim 1, further comprising an actuator configured to adjust a position of a lens using the drive signal.

7. A method of generating a drive signal, the method comprising:
   receiving an acceleration signal and an angular velocity signal, wherein the acceleration signal comprises an x-component, a y-component, and a z-component;
   computing a first angle based on the y-component and the x-component, a second angle based on the z-component and the x-component, and a third angle based on the y-component and the z-component;
   determining whether one of the first, second, and third angles has a zero value;
   selecting, in response to one of the first, second, and third angles having a zero value, one of a plurality of predetermined zones, each predetermined zone of the plurality of predetermined zones representing a range of angles, based on the remaining angles and assigning the predetermined zone to the angle equaling zero;
   selecting a first gain value from a plurality of predetermined gain values based on the first, second, and third angles;
   applying the first gain value to a filtered version of the angular velocity signal to generate a modified signal; and
   generating the drive signal based on the modified signal.

8. The method of claim 7, further comprising, receiving, from a gyro sensor, the acceleration signal and the angular velocity signal.

9. The method of claim 7, wherein computing the first angle includes determining a first arctangent of the y-component divided by the x-component.

10. The method of claim 7, wherein computing the second angle includes determining a second arctangent of the z-component divided by the x-component.

11. The method of claim 7, wherein computing the third angle includes determining a third arctangent of the y-component divided by the z-component.

12. The method of claim 7, further comprising, adjusting, by an actuator using the drive signal, a position of a lens coupled to the actuator.

13. The method of claim 7, further comprising, integrating the angular velocity signal to generate the filtered version of the angular velocity signal.

14. A system, comprising:
   a gyro sensor capable of generating an acceleration signal and an angular velocity signal, wherein the acceleration signals includes an x-component, a y-component, and a z-component;
   a driver circuit connected to the gyro sensor, wherein the driver circuit is configured to:
      receive the acceleration signal and the angular velocity signal;
      compute a first angle based on the y-component and the x-component, a second angle based on the z-component and the x-component, and a third angle based on the y-component and the z-component;
      determine whether one of the first, second, and third angles has a zero value;
      select, in response to one of the first, second, and third angles having a zero value, one of a plurality of predetermined zones, each predetermined zone of the plurality of predetermined zones representing a range of angles, based on the remaining angles and assigning the predetermined zone to the angle equaling zero;
      select a first gain value from a plurality of predetermined gain values based on the first, second, and third angles;
      apply the first gain value to a filtered version of the angular velocity signal to generate a modified signal; and
      generate a drive signal based on the modified signal.

15. The system of claim 14, wherein to compute the first angle, the driver circuit is further configured to determine a first arctangent of the y-component divided by the x-component.

16. The system of claim 14, wherein to compute the second angle, the driver circuit is further configured to determine a second arctangent of the z-component divided by the x-component.

17. The system of claim 14, wherein to compute the third angle, the driver circuit is further configured to determine a third arctangent of the y-component divided by the z-component.

18. The system of claim 14, further comprising an actuator configured to adjust a position of a lens using the drive signal.

19. The system of claim 14, wherein the driver circuit is further configured to separately filter the x-component, the y-component, and the z-component.

20. The system of claim 14, wherein the driver circuit is further configured to integrate the angular velocity signal to generate the filtered version of the angular velocity signal.

* * * * *